United States Patent

Park

[11] Patent Number: 5,943,400
[45] Date of Patent: Aug. 24, 1999

[54] VOICE MAILING SYSTEM FOR PERFORMING FAX MAIL SERVICE AND SERVICE METHOD THEREFOR

[75] Inventor: Kyung-Won Park, Suwon-city, Rep. of Korea

[73] Assignee: SamSung Electronics Co., Ltd., Kyungki-do, Rep. of Korea

[21] Appl. No.: 08/685,554

[22] Filed: Jul. 24, 1996

[30] Foreign Application Priority Data

Aug. 31, 1995 [KR] Rep. of Korea ................. 95-28389

[51] Int. Cl.⁶ ................................................. H04M 1/64
[52] U.S. Cl. ............................... 379/88.22; 379/100.01; 379/100.08
[58] Field of Search ................. 379/67, 88, 89, 379/90.01, 100.01, 100.03, 100.08, 88.13, 88.22, 88.25, 88.26, 88.27, 88.28; 358/402, 403

[56] References Cited

U.S. PATENT DOCUMENTS

| | | | |
|---|---|---|---|
| 4,837,798 | 6/1989 | Cohen et al. | 379/88 |
| 4,972,462 | 11/1990 | Shibata | 379/89 |
| 5,008,926 | 4/1991 | Misholi | 379/89 |
| 5,193,110 | 3/1993 | Jones et al. | 379/88 |
| 5,235,433 | 8/1993 | Clarkson et al. | 358/434 |
| 5,257,112 | 10/1993 | Okada | 358/402 |
| 5,317,628 | 5/1994 | Misholi et al. | 379/89 |
| 5,333,266 | 7/1994 | Boaz et al. | 395/200 |
| 5,339,156 | 8/1994 | Ishii | 358/402 |
| 5,349,636 | 9/1994 | Irribarren | 379/89 |
| 5,448,626 | 9/1995 | Kajiya et al. | 379/67 |
| 5,454,030 | 9/1995 | De Oliveira et al. | 379/88 |
| 5,461,665 | 10/1995 | Shur et al. | 379/67 |
| 5,479,411 | 12/1995 | Klein | 370/110.1 |
| 5,479,491 | 12/1995 | Herrero Garcia et al. | 379/88 |
| 5,483,580 | 1/1996 | Brandman et al. | 379/88 |
| 5,517,556 | 5/1996 | Pounds et al. | 379/67 |
| 5,524,137 | 6/1996 | Rhee | 379/67 |
| 5,524,139 | 6/1996 | Jones | 379/67 |
| 5,633,916 | 5/1997 | Goldhagen et al. | 379/67 |
| 5,675,507 | 10/1997 | Bobo, II | 364/514 R |
| 5,717,742 | 2/1998 | Hyde-Thomson | 379/88 |

*Primary Examiner*—Scott L. Weaver
*Attorney, Agent, or Firm*—Robert E. Bushnell, Esq.

[57] ABSTRACT

A voice mailing system and a service method for additionally processing fax mail while intactly maintaining the voice mail in order to save memory requirement and simplify the mail management structure. The voice mail system where a corresponding profile box is accessed by a profile number to perform a voice mail service, contains a memory having a plurality of data cells for storing fax data, transactions for storing index of the data cells, a storing date and time, a storing mail format, and page classifying information for each fax mail; and a plurality of mailboxes for storing index information of the fax mail.

9 Claims, 4 Drawing Sheets

| FAX DATA TRN |
|---|
| MAIL FORMAT |
| MAIL STORING TIME |
| DATA CELL NO. 1 |
| DATA CELL NO. 2 |
| ⋮ |
| DOCUMENT PAGE NO. 1 |
| DOCUMENT PAGE NO. 2 |
| ⋮ |

*Fig. 4A*

| VOICE DATA TRN |
|---|
| MAIL FORMAT |
| MAIL STORING TIME |
| DATA CELL NO. 1 |
| DATA CELL NO. 2 |
| ⋮ |
| DATA CELL NO. n |

*Fig. 4B*

VOICE MAILING SYSTEM FOR PERFORMING FAX MAIL SERVICE AND SERVICE METHOD THEREFOR

CROSS-REFERENCE TO RELATED APPLICATION

This application makes reference to, incorporates the same herein, and claims all benefits accruing under 35 U.S.C. §119 from an application for Voice Mailing System For Performing Fax Mail Service And Service Method Therefor earlier filed in the Korean Industrial Property Office on Aug. 31, 1995, and there duly assigned Ser. No. 28389/1995.

BACKGROUND OF THE INVENTION

1. Technical Field

The present invention relates to a mail management system and, in particular, to a voice mailing system for performing both a voice mail service and a fax mail service and a service method therefor.

2. Background Art

In general, a proper mail management system is required for systematically managing voice messages and facsimile messages just as general data used in a general computer system. However, since digitalized voice data and facsimile data are fundamentally different from the general data in terms of real time processing, it is inadequate to use a conventional file management of the general computer system to manage the digitalized voice data and facsimile data. For this reason, voice mail is usually managed by a voice mail system, and fax mail is managed by a facsimile mail system separately.

Conventional voice mail system combines telephone and computer technology to create a system of "voice mail" over telephone lines that is analogous to the standard "written mail" system. In the conventional voice mail system such as disclosed in U.S. Pat. No. 4,761,807 issued to Matthews et al., and U.S. Pat. No. 5,479,491 for Integrated Voice-Mail Based Voice And Information Processing System issued to Herrero Garcia et al., a caller first calls an intended recipient by telephone. If the intended recipient of the call is absent, the caller is automatically connected to the recipient's voice message system. This system enables the caller to record a message for the recipient-subscriber in the caller's own voice, which message is then stored in an electronic format by the system. When subscriber calls into the system, he/she can play back the voice message on his telephone by issuing suitable commands.

Conventional facsimile mail system such as disclosed in U.S. Pat. No. 5,257,112 for Facsimile Mail System With Mail Center Equipment issued to Okada, on the other hand, serves as a mail center connected to a plurality of subscriber facsimile machines through a telephone network. Generally, such facsimile mail system is used to store an incoming facsimile message in an electronic format for later recall by the system subscriber. In this manner, the intended recipient may, for example, call into the office from a remote location, determine that a facsimile transmittal is available for him, and then direct that the text or image stored in the system be transmitted for printout to a facsimile machine at the remote location.

The facsimile mail system may be annotated with a voice message in a form of a composite voice/data message system such as disclosed in U.S. Pat. No. 5,448,626 for Facsimile Mail System HavingMeans For Storing Facsimile Signals And Telephone Signals issued to Kajiya et al., and U. S. Pat. No. 5,483,580 for Methods And Apparatus For Non-Simultaneous Transmittal And Storage Of Voice Message AndDigital Text Or Image issued to Brandman et al. For example, Brandman et al. '580 discloses a composite voice/data message system that enables a call to create a composite voice and data message in an electronic format for storage in, and subsequently retrieval by the intended recipient from, a mailbox assigned to the recipient.

The integration of voice and facsimile mail messages is commonly used for multi-media systems such as in U.S. Pat. No. 4,972,462 for Multimedia Mail System issued to Shibata, and U.S. Pat. Nos. 5,008,926 and 5,317,628 for Message Management System issued to Misholi et al. For example, Misholi et al. '926 discloses an integrated voice-and-facsimile store-and-forward message file system that provides for the sending, storage, and delivery of voice messages, fax messages, fax messages annotated with voice messages, and voice messages annotated with fax messages. The disclosed system additionally provides for display of fax messages on terminal screens, and the conversion of fax printed text messages into voice messages via text-to-speech conversion facilities.

More recent multi-media mailing systems are disclosed in a Korean Patent Application No. 93-17266 and a profile box management method of a voice mailing system is disclosed in a Korean Patent Application No. 93-26103, all of which have been assigned to the same assignee, Samsung Electronics Ltd., as the present invention. The conventional multi-media mailing systems are however complex. In addition, the voice mail and fax mail are separately managed by the mail management network. This often requires an advanced and complicated internal structure with high capacity memory to manage the voice mail and fax mail separately.

SUMMARY OF THE INVENTION

Accordingly, it is therefore an object of the present invention to provide a voice mail system capable of handling both voice mail and fax mail.

It is another object to provide a voice mail system for efficiently performing a voice mail service and a fax mail service using a simplified internal memory.

These and other objects can be achieved by a voice mail system using an internal memory comprising a plurality of profile boxes each corresponding to each subscriber connected to the system and containing a profile number and subscriber's information including telephone number, facsimile number, and index of mailboxes and each mailbox including data cells storing voice mail and fax mail and transaction information of the voice mail and fax mail including a storing date and time, a storing mail format, and page classifying information.

The voice mail system is accessed for servicing voice mail or fax mail by analyzing an input of the subscriber and determining whether a fax data storing mode, a fax data retrieval mode or a fax data deleting mode is selected by the subscriber; upon selection of the fax data storing mode, finding a blank transaction, storing a given fax message at an arbitrary data cell, connecting the transaction with a corresponding mail box, and registering the mail box at a subscriber's profile box; upon selection of the fax data retrieval mode, detecting an arbitrary transaction and transmitting to a subscriber's facsimile machine the fax message stored in corresponding data cells in accordance with document page information; and upon selection of the fax data deleting mode, detecting the arbitrary transaction, classifying the transaction from the corresponding mail box, deleting the fax message stored in corresponding data cells in accordance with said document page information, and initializing the transaction. When a voice data storing mode is selected by the subscriber, however, finding a blank transaction, storing given voice data in arbitrary data cells, connecting the transaction with a corresponding mail box, and registering the mail box in the subscriber's profile box.

The present invention is more specifically described in the following paragraphs by reference to the drawings attached only by way of example.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein:

FIGS. 4A and 4B are diagrams illustrating transactions of voice/fax data according to the present invention.

DETAILED DESCRIPTION OF THE PREFERRED EMBODIMENT

Figure 1:
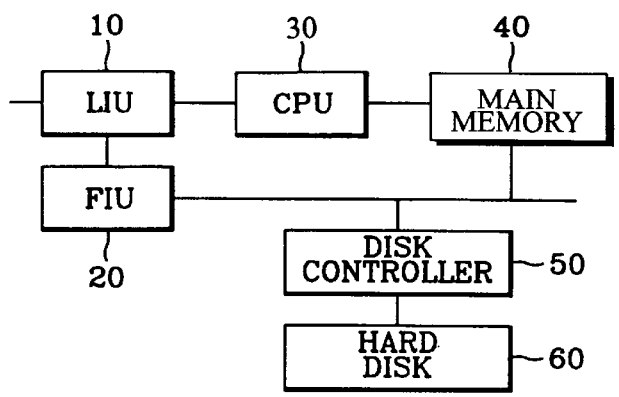
FIG. 1 is a block diagram illustrating the construction of a voice mail system according to the present invention.

Referring now to the drawings and particularly to FIG. 1, which illustrates a voice mail system constructed according to the principles of the present invention. The voice mail system includes a line interface unit 10, a fax interface unit 20, a central processing unit 30 for controlling operation of the voice mail service and the fax mail service, a main memory 40, a disk controller 50 and a hard disk 60.

The line interface unit 10 is interfaced with a public line or a telephone line connected to a telephone network for enabling a subscriber's telephone or facsimile machine connected to the telephone network to access the voice mail system. The fax interface unit 20 is interfaced with the line interface unit 10, for compressing the general voice/fax data and reducing the amount of information or reproducing the compressed voice/fax information. The central processing unit (CPU) 30 is connected to the line interface unit 10 for controlling an overall operation of the voice mail system. The main memory 40 is connected to the line interface unit 10 and the fax interface unit 20 for storing a control program of the CPU 30, the voice information, or the fax information. The disk controller 50 is connected to the fax interface unit 20 and the main memory 40 for generating a control signal to control the writing and reading of processed voice and fax data stored in the hard disk 60 according to instruction from the CPU 30.

Figure 2:
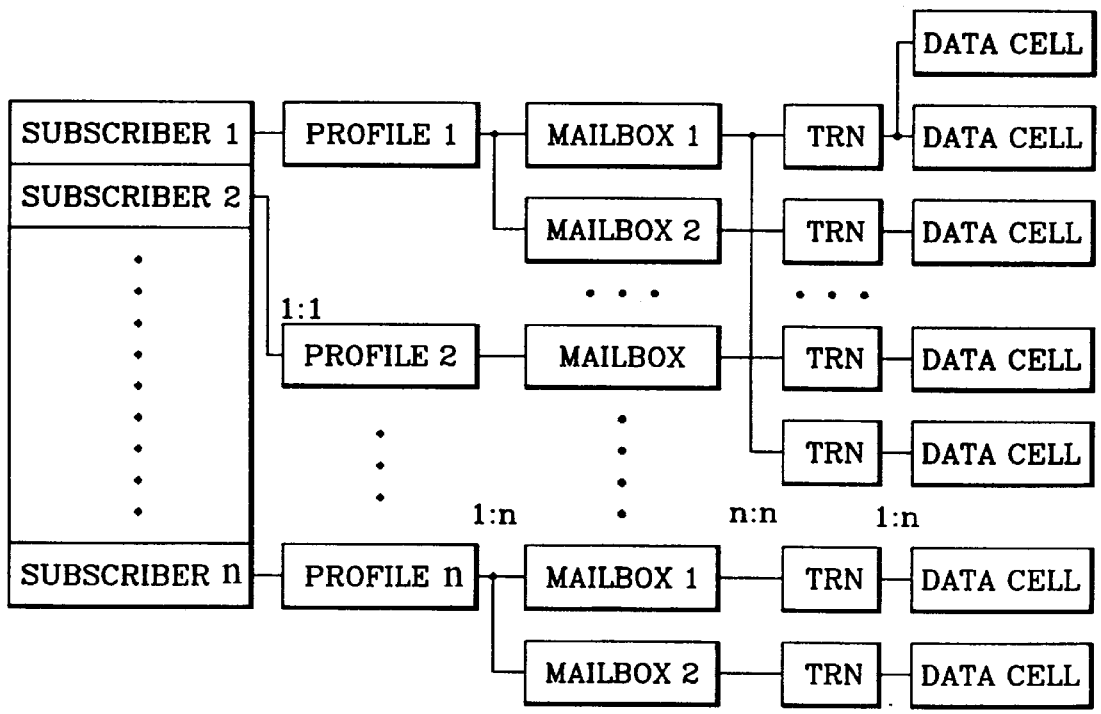
FIG. 2 illustrates a mail management structure of the voice mail system according to the present invention.

Turning now to FIG. 2 which illustrates a mail management structure of a hard disk 60 in the voice mail system according to the present invention. The hard disk 60 contains profiles, mailboxes, transactions (TRN), data cells and so on. Each profile corresponds to a designated subscriber connected to the system and contains a profile number and subscriber's identification information such as telephone number, facsimile number, and index of mailboxes and each mailbox contains index of transaction information and transaction information of the voice mail and fax mail including a storing date and time, a storing mail format, page classifying information and index of data cells storing voice mail and fax mail. The fax mail corresponds to each transaction for each mailbox. The data cell corresponds to a memory having a given size in the hard disk 60 where the stored fax data is retained. That is, the fax mail can be stored in a plurality of data cells which are displayed at the transactions. The reason that a fax mail typically requires more than one data cell having the given size as described above, is that a plurality of channels should be simultaneously processed during real time and the size of the fax data is typically great. As mentioned above, the transaction information includes an index for the data cells and retains a storing date and time, a storing mail format and page classifying information of the fax mail all of which constitute a single fax mail. In addition, the transaction is classified according to the feature thereof and belongs to the mail box. Therefore, the mail box corresponds to an index table for the fax mail, so that the subscriber can share the fax mail.

A fax profile subscriber accesses the voice mail system by using a profile number allotted. Likewise, in the voice mail system as contemplated by the present invention, the total voice mail and fax mail service is accomplished by using the profile number. In a preferable embodiment of the present invention, a single profile contains one hundred fax mails. In addition, all kinds of information which relate to the profile box, for example, the profile number, the sort of the profile, a user's name, a service class, a user's telephone number, a user's fax number, and a mail box number, are stored in the profile in order to constitute a most fuindamental database in the service method of the voice mail system.

The profile has the index for the mail box which classifies and stores the fax mail of the given number in conformity with a usable use thereof While the above transaction has the substantial data for the fax mail, the mail box includes the index for the transaction, retains several additional information for the service method of the voice mailing system, thereby connecting the profile and the transaction to each other.

Figure 3A:
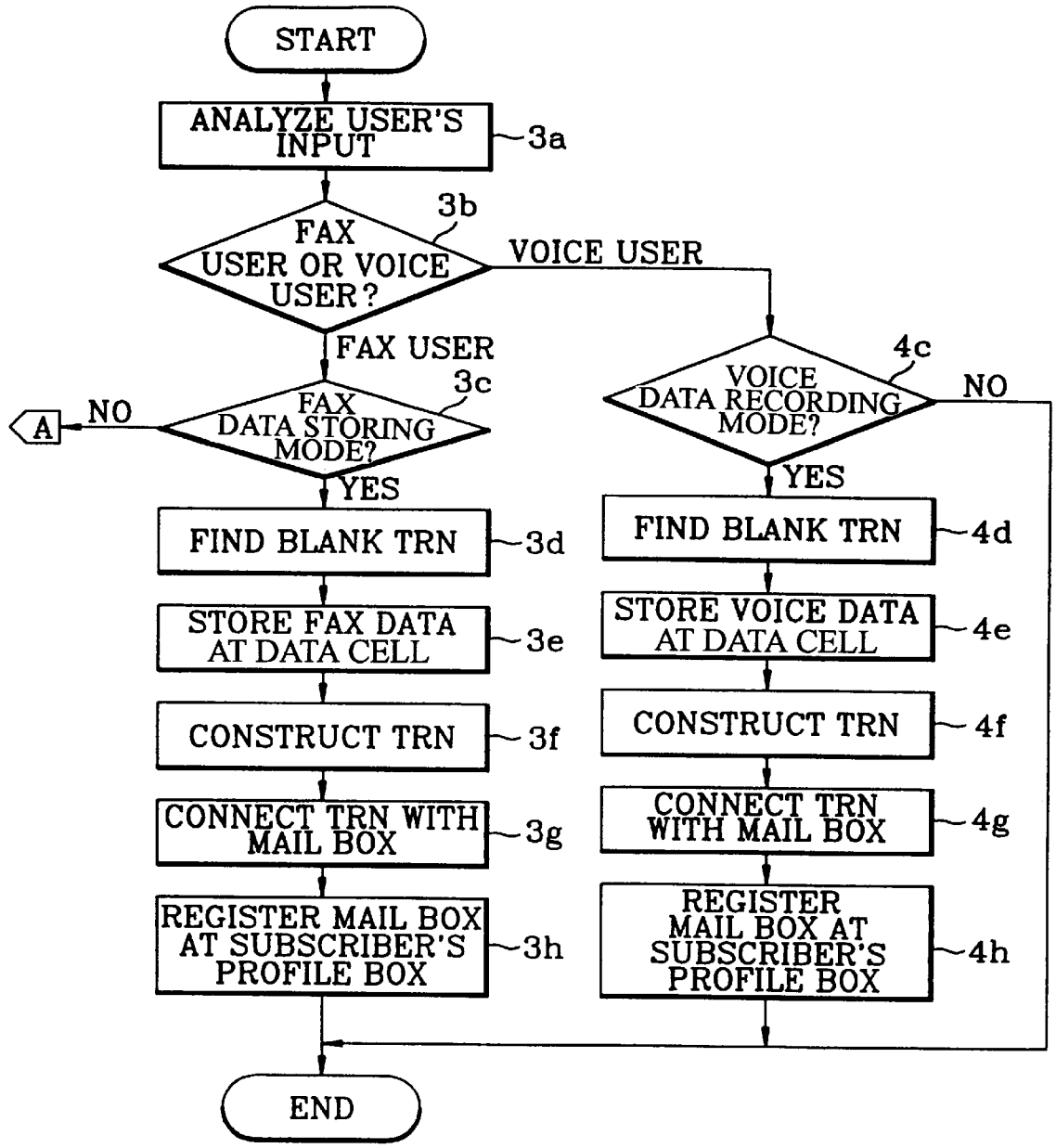
FIGS. 3A and 3B are flow charts illustrating a process of performing a voice mail service and a fax mail service of the voice mail system according to the present invention.
Figure 3B:
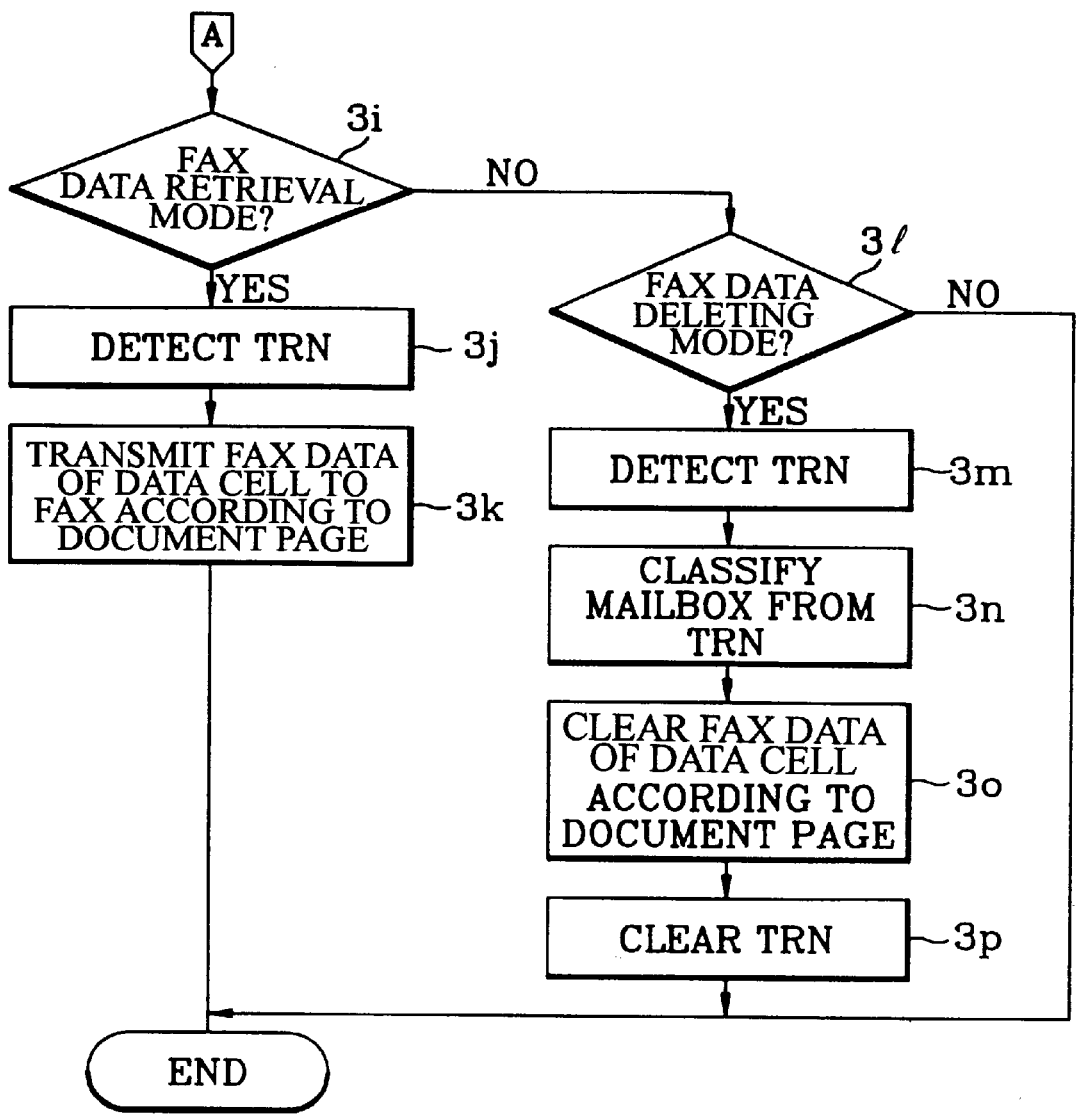

Refer now to FIGS. 3A and 3B which illustrates a process of performing a voice mail service and a fax mail service of the voice mail system according to the present invention, and FIG. 4 which illustrates voice data and fax data transactions of the voice mail system according to the present invention. A process of performing a voice mail service and a fax mail service in the voice mail system will now be described with reference to FIGS. 3 and 4 as follows.

When a subscriber accesses the voice mail system for the purpose of recording the voice mail or storing the fax mail, the CPU 30 of the voice mail system analyzes the user's input through the line interface unit 10 at step. The CPU 30 then determines whether the user's input indicates a fax user or a voice user at step 3*b*. When the user's input indicates a fax user, the CPU 30 determines, at step 3*c*, whether the fax data will be stored in the hard disk 60. When the fax data is stored in the hard disk 60 at step 3*c*, the CPU 30 finds a blank transaction corresponding to a mailbox of an intended recipient for storing the new fax data in the mail management structure of the hard disk 60 at step 3*d*. Once the blank transaction is found at step 3*d*, the disk controller 50 stores the new fax data at data memory cells of the hard disk 60 under control of the CPU 30 at step 3*e*. After the new fax data is stored at the data memory cells of the hard disk 60 at step 3*e*, the CPU 30 constructs a transaction in the hard disk 60 and provides a mail format of the fax data transaction as shown in FIG. 4A including a mail storing date and time, the occupied data memory cells and page number of different documents. In any event however, the CPU 30 connects the transaction with the corresponding mailbox at step 3g and then registers the corresponding mailbox at the subscriber's profile box of the hard disk 60 as shown in FIG. 2.

When the user's input indicates a voice user at step 3b, however, the CPU 30 determines whether the voice data will be recorded in the hard disk 60 at step 4c. When the voice data will be recorded in the hard disk 60 at step 4c, the CPU 30 finds a blank transaction corresponding to a mailbox of an intended recipient for storing the new voice data in the hard disk 60 at step 4d. Once the blank transaction is found at step 4d, the disk controller 50 stores the new voice data at data memory cells of the hard disk 60 under control of the CPU 30 at step 4e. After the new voice data is stored at the data memory cells of the hard disk 60 at step 4e, the CPU 30 constructs a transaction in the hard disk 60 and provides a mail format of the voice data transaction as shown in FIG. 4B including a mail storing date and time, the occupied data memory cells and page number of different documents. In any event however, the CPU 30 connects the transaction with the corresponding mailbox at step 4g and then registers the corresponding mailbox at the subscriber's profile box of the memory 40 as shown in FIG. 2.

In the meantime, if the fax data was not stored in the hard disk 60 at step 3c, the CPU 30 determines whether fax data will be detected at step 3i. When the fax data is retrieved at step 3i, the CPU 30 retrieves the fax mail transaction at step 3j and, in turn, transmits the fax data stored in the data memory cells of the hard disk 60 to an intended recipient's facsimile machine in accordance with the document page information of the transaction at step 3k. When the fax data is not retrieved at step 3i, the CPU 30 determines whether the fax data will be deleted at step 3l. As a consequence, upon deletion of the fax data, the CPU 30 detects the fax mail transaction at step 3m and, in steps 3n to 3p, classifies the mail box from the transaction, clears the data of the data cells in accordance with the document page information of the transaction, and finally clears the transaction. Thereafter, the CPU 30 clears the information of the transaction.

As described from the foregoing, the present invention has many advantages in that, while intactly performing the voice mail service, the fax mail service can be performed by not changing the circuit structure of the conventional voice mail system but the structure of the transaction in the voice mail system. As a result, the present invention advantageously reduces the memory requirement in processing both the voice mail data and the fax mail data as well as simplifying the structure of the system.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. A voice mailing system, comprising:

means connected to a telephone exchange, for receiving one of voice data and fax data from the telephone exchange;

memory means having a mail management structure for storing said voice data and fax data, said memory means containing a plurality of profile boxes each corresponding to a subscriber and including a plurality of mailboxes each containing transactions and a plurality of data cells for storing voice data and fax data, each transaction of the mailbox representing one of a voice mail and a fax mail and including an index of said fax mail contained in data cells with a storing date and time, a storing mail format, and page classifying information; and control means for permitting a subscriber to access a corresponding profile box by a profile number to record one of said voice data and said fax data in said memory means and to retrieve one of said voice data and said fax data recorded in said memory means.

2. The voice mailing system of claim 1, further comprised of said control means permitting said subscriber to record said fax data in said memory means by:

when the subscriber's input indicates a fax subscriber, making a determination of whether the fax data will be stored in said memory means;

when said determination indicates that the fax data will be stored in said memory means, searching for a blank transaction corresponding to a mailbox of said subscriber;

storing new fax data in empty data cells of said memory means corresponding to said blank transaction;

constructing a fax data transaction in said memory means including a mail storing date and time, occupied data cells and page number of a document from said blank transaction; and connecting said fax data transaction with a corresponding mailbox, and then registering the corresponding mailbox at the subscriber's profile box of said memory means.

3. The voice mailing system of claim 1, further comprised of said control means permitting said subscriber to record said voice data in said memory means by:

when the subscriber's input indicates a voice subscriber, determining whether the voice data representing a voice message will be stored in said memory means;

when the voice data will be stored in said memory means, searching for a blank transaction corresponding to a mailbox of said subscriber;

storing new voice data in empty data cells of said memory means corresponding to said blank transaction;

constructing a voice data transaction in said memory means including a mail storing date and time, occupied data cells storing said voice message from said blank transaction; and connecting said voice data transaction with a corresponding mailbox, and then registering the corresponding mailbox at the subscriber's profile box of said memory means.

4. A voice mailing system comprising:

means connected to a telephone exchange, for receiving one of voice data and fax data from the telephone exchange;

a memory having a mail management structure for storing voice data and fax data, and containing a plurality of profile boxes each corresponding to a subscriber, a plurality of mailboxes each containing transactions and a plurality of data cells for storing voice data and fax data, each of said transactions of the mailbox representing one of a voice mail and a fax mail and including an index of said fax mail contained in data cells with a date and time of storage in said data cells, a storing mail format, and page classifying information; and a controller for permitting a subscriber to access a corresponding profile box by a profile number to record one of said voice data and said fax data in said memory and to retrieve one of said voice data and said fax data recorded in said memory by:

when the fax data will not be stored in said memory, determining whether the fax data will be retrieved from said memory;

upon retrieval of the fax data, retrieving the fax mail transaction and transmitting the fax data stored in the data cells of said memory to the subscriber's facsimile machine in accordance with document page information of the fax mail transaction;

upon non-retrieval of the fax data, determining whether the fax data will be deleted from said memory; and when the fax data will be deleted from said memory, detecting the fax mail transaction, classifying the mail box from the fax mail transaction, clearing the fax data contained in the data cells in accordance with the document page information of the fax mail transaction, and finally clearing the fax mail transaction.

5. A fax mail service method of a voice mailing system having a memory arranged to contain a plurality of data cells for storing fax data, transactions for containing an index of the data cells, a storing date and time, a storing mail format, and page classifying information which constitute a fax mail, and a plurality of mailboxes for storing index information of said fax mail, said fax mail service method comprising the steps of:

analyzing a subscriber's input and determining whether one of a fax data storing mode, a fax data retrieval mode and a fax data deleting mode is selected by the subscriber;

upon selection of said fax data storing mode, finding a blank transaction, constructing a fax data transaction by storing given fax data at an arbitrary data cell corresponding to said blank transaction, connecting said fax data transaction with a corresponding mail box, and registering said mail box at a subscriber's profile box;

upon selection of said fax data retrieval mode, retrieving an arbitrary transaction and transmitting to a facsimile system of the subscriber, said fax data stored at said corresponding data cells in accordance with document page information corresponding to said arbitrary transaction; and upon selection of said fax data deleting mode, detecting another arbitrary transaction, classifying said another arbitrary transaction from said corresponding mail box, deleting said fax data stored at said corresponding data cells in accordance with said document page information corresponding to said another arbitrary transaction, and initializing said another arbitrary transaction.

6. The fax mail service method of claim 5, further comprised of steps of:

determining whether a voice data storing mode is selected by the subscriber; and upon selection of said voice data storing mode, finding a blank transaction, constructed a voice data transaction by storing given voice data at said arbitrary data cell corresponding to said blank transaction, connecting said voice data transaction with said corresponding mail box, and registering said mail box at said subscriber's profile box.

7. A method of accessing a hard disk contained in a voice message system and having a plurality of profile boxes each corresponding to a subscriber and including a plurality of mailboxes each containing transactions and a plurality of data cells for storing voice data and fax data, each transaction of the mailbox representing one of a voice mail and a fax mail and including an index of said fax mail contained in data cells with a storing date and time, a storing mail format, and page classifying information, said method comprising the steps of:

determining whether a subscriber's input indicates one of a fax subscriber and a voice subscriber;

when the subscriber's input indicates a fax subscriber, determining whether the fax data will be stored in said hard disk;

when the fax data will be stored in said hard disk, searching for a blank transaction corresponding to a mailbox of said subscriber;

storing new fax data in empty data cells of said hard disk corresponding to said blank transaction;

constructing a fax data transaction in said hard disk including a mail storing date and time, occupied data cells and page number of a document from said blank transaction; and connecting said fax data transaction with a corresponding mailbox, and then registering the corresponding mailbox at the subscriber's profile box of said hard disk.

8. The method of claim 7, further comprising:

when the subscriber's input indicates a voice subscriber, determining whether the voice data representing a voice message will be stored in said hard disk;

when the voice data will be stored in said hard disk, searching for a blank transaction corresponding to a mailbox of said subscriber;

storing new voice data in empty data cells of said hard disk corresponding to said blank transaction;

constructing a voice data transaction in said hard disk including a mail storing date and time, occupied data cells storing said voice message from said blank transaction; and connecting said voice data transaction with to corresponding mailbox, and then registering the corresponding mailbox at the subscriber's profile box of said hard disk.

9. A method of accessing a hard disk contained in a voice message system and having a plurality of profile boxes each corresponding to a subscriber and including a plurality of mailboxes each containing transactions and a plurality of data cells for storing voice data and fax data, each transaction of the mailbox representing one of a voice mail and a fax mail and including an index of said fax mail contained in data cells with a storing date and time, a storing mail format, and page classifying information, said method comprising the steps of:

determining whether a subscriber's input indicates one of a fax subscriber and a voice subscriber;

when the subscriber's input indicates a fax subscriber, determining whether the fax data will be stored in said hard disk;

when the fax data will be stored in said hard disk, searching for a blank transaction corresponding to a mailbox of said subscriber;

storing new fax data in empty data cells of said hard disk corresponding to the blank transaction;

constructing a fax data transaction in said hard disk including a mail storing date and time, occupied data cells and page number of a document from the blank transaction;

connecting the fax data transaction with a corresponding mailbox, and then registering the corresponding mailbox at the subscriber's profile box of said hard disk;

when the fax data will not be stored in said hard disk, determining whether the fax data will be retrieved from said hard disk;

upon retrieval of the fax data, retrieving the fax mail transaction and transmitting the fax data stored in the data cells of said hard disk to a facsimile system of the subscriber in accordance with the document page information of the fax mail transaction;

upon non-retrieval of the fax data, determining whether the fax data will be deleted from said hard disk; and when the fax data will be deleted from said hard disk, detecting the fax mail transaction, classifying the mailbox from the fax mail transaction, clearing the fax data contained in the data cells in accordance with the document page information of the fax mail transaction, and finally clearing the fax mail transaction.

* * * * *